US005424257A

United States Patent [19]

Schat et al.

[11] Patent Number: 5,424,257

[45] Date of Patent: Jun. 13, 1995

[54] CERAMIC MOLDINGS COMPOSED OF ALUMINUM OXIDE HAVING HIGH METALLIZATION ADHESION

[75] Inventors: Bralt R. Schat, Eindhoven, Netherlands; Wolfgang Krahn, Marktredwitz; Jürgen Ruska, Selb, both of Germany

[73] Assignee: Hoechst CeramTec Aktiengesellschaft, Selb, Germany

[21] Appl. No.: 41,589

[22] Filed: Apr. 5, 1993

[30] Foreign Application Priority Data

Apr. 4, 1992 [DE] Germany ........................ 42 11 418.7

[51] Int. Cl.[6] ............................................. C04B 35/10

[52] U.S. Cl. .................................. 501/127; 501/128; 501/153

[58] Field of Search ........................ 501/127, 128, 153

[56] References Cited

U.S. PATENT DOCUMENTS

| | | | |
|---|---|---|---|
| 2,725,286 | 11/1955 | Coes, Jr. | 501/153 X |
| 3,022,685 | 2/1962 | Armacost | 501/128 X |
| 3,615,763 | 10/1971 | Flock | 501/128 |
| 3,627,547 | 12/1971 | Bailey et al. | 501/153 |
| 3,784,388 | 1/1974 | King et al. | 501/128 |
| 4,582,813 | 4/1986 | Kanda et al. | 501/128 |
| 4,601,990 | 7/1986 | Ando et al. | 501/153 |
| 4,601,991 | 7/1986 | Ando et al. | 501/153 |
| 5,104,834 | 4/1992 | Watanabe et al. | 501/127 |
| 5,175,132 | 12/1992 | Ketcham et al. | 501/103 |

FOREIGN PATENT DOCUMENTS

| | | | |
|---|---|---|---|
| 2459176 | 7/1975 | Germany | 501/128 |
| 0149710 | 11/1979 | Japan | 501/153 |

OTHER PUBLICATIONS

*Alumina as a Ceramic Material,* Edtd by Gitzen 1970 (no month) pp. 130–134.

"Effect of Composition & Crystal Size of Alumina Ceramics on Metal-to-Ceramic Bond Strength" Floyd, Feb. 1963 *Bull. Amer. Cer Soc* vol. 42, #2, pp. 65–70.

C. A. Powell-Dogan et al., MICROSTRUCTURE OF 96% ALUMINA CERAMICS: 1, CHARACTERIZATION OF THE SINTERED MATERIALS, J. Am. Ceram. Soc., 73[12] 3670–3676–1990 (No Month).

*Primary Examiner*—Mark L. Bell
*Assistant Examiner*—David Sample
*Attorney, Agent, or Firm*—Foley & Lardner

[57] ABSTRACT

Ceramic moldings composed of aluminum oxide which have a proportion of intercrystalline fracture of more than 50%, an average pore radius of more than 4 μm and a porosity of more than 2%, are obtained by:

a) grinding aluminum oxide which is at least 99.5% pure and has an average primary crystal size of 1 to 4 μm to an average fragment size of 2 to 7 μm, b) adding a source of magnesium oxide, silicon oxide and calcium oxide in amounts such that the magnesium oxide content is 0.2 to 2.5%, the silicon dioxide content is 1 to 6% and the calcium oxide content is 0.1 to 2.5%, in each case with respect to the amount of $Al_2O_3$, c) shaping a green compact and d) sintering.

11 Claims, No Drawings

CERAMIC MOLDINGS COMPOSED OF ALUMINUM OXIDE HAVING HIGH METALLIZATION ADHESION

BACKGROUND OF THE INVENTION

Because of their advantageous properties such as high compressive strength and flexural strength, low specific weight, high corrosion resistance, high use temperatures, low thermal expansion and very good electrical insulation properties, ceramic moldings are being used to an ever increasing extent in diverse products, inter alia also for the production of components for the electrical industry. Use as a component makes it necessary for the ceramic to be firmly bonded to materials of a different type, in particular to metals.

To this end the ceramic surface is usually first metallized, for instance by currentless nickel plating. This nickel layer can then be further thickened by electroplating with nickel. Further metal layers can then be deposited on said layer in order to ensure good soldering with metal components. It is obvious that the adhesion of the composite constituents is of decisive importance in this ceramic and metal composite.

In addition to currentless metal deposition, in principle other chemical or electroplating processes, chemical vapor deposition, physical vapor deposition, sputtering, plasma spraying and all other techniques known to those skilled in the art are also suitable as coating techniques.

SUMMARY OF THE INVENTION

The object of the present invention is the production of ceramic moldings composed of $Al_2O_3$ which, following a metallization, show improved adhesion of the composite constituents compared with the prior art. In addition to metals, metal alloys, glasses, ceramic coatings or organic compounds such as polymers are, of course, also possible as bonding constituents.

The object is achieved in that a material is produced which on machining gives a good surface or on separation gives a fracture surface which offers good anchoring possibilities for deposited coating materials, such as, for example, metals. Targeted adjustment of particular characteristics of the bonding surface is of importance insofar as the bonding of ceramics with other materials frequently is of essentially mechanical nature with frictional connection and form closure and chemical bonding components play virtually no role.

DETAILED DESCRIPTION

The establishment of a well structured bonding surface with good anchoring possibilities is effected by the introduction of pores, the number, size and shape thereof, by reversing the fracture pattern from transcrystalline to intercrystalline fracture and by second phases which can be dissolved out and which, for example, are readily removable by etching treatments.

If pores in the ceramic are filled with bonding material, they form a plurality of anchoring points for the coating material. In order to separate the bonding constituent from the ceramic, these anchorings must be pulled out of the pores or torn through, back-gripping pores, i.e. pores which have a somewhat smaller opening diameter in the parting plane than their total diameter, providing particularly effective resistance against this.

Pore size and pore number can, inter alia, be adjusted by grinding the starting materials to a specific particle size distribution. Here it is advantageous not to comminute the starting raw materials completely down to their native individual grains but also to produce fragments of raw material agglomerates which, in turn, still comprise several individual grains. The advantage of this procedure lies in the fact that the surfaces of such particles follow very irregular curvatures and, therefore, relatively large cavities can be obtained when the fragments are added to the green compact, which cavities then close only poorly on sintering. Reduction of the proportion of fine particles is also advantageous because, as a result, small particles will less frequently fill the cavities formed by the fragments. Pore size and pore number can also be adjusted by the choice and distribution of the sinter additives and by controlling the shrinkage process during firing. A suitable bonding surface must, now, offer further adhesion mechanisms in addition to pores. To this end, the formation of a surface which has the largest possible number of changes in direction can make a valuable contribution. If the ceramic is machined or separated, a microstructurally controlled parting pattern can have a decisive influence on the surface structure of the parting plane. Said parting plane pattern should therefore preferably be intergranular, i.e. along the boundary surfaces of the individual grains. On the other hand, a transgranular fracture which cleaves the individual grains is disadvantageous. The effective parting plane in the case of an intercrystalline fracture pattern can be a multiple of the effective parting plane as in the case of transgranular fracture. As a result of the multiplicity of changes in direction in the bonding surface, removal of the counter layer by tensile or shear forces is made more difficult, because these forces would continually have to change their direction in the parting plane as itself. Control of the fracture pattern from transcrystalline to intercrystalline fracture can advantageously be controlled by the choice of suitable second phases or grain boundary phases in the case of multiphase ceramic materials.

The third contribution made by the ceramic material towards facilitating well structured parting planes lies in the fact that etching processes make it possible to remove material, especially of second phases, in amounts such that relatively deep grooves and pits are able to form between the crystallites of the primary phase. Etching furrows of this type also give rise to further changes in direction in the microstructure of the parting plane and are thus able to provide additional adhesion points for the bonding material.

According to the invention, moldings having these properties are obtained by grinding aluminum oxide in a suitable mill to a specific average particle size and particle size distribution with a reduced proportion of fine particles and adding specific amounts of sinter aids to this aluminum oxide, magnesium oxide-containing, calcium oxide-containing and silicon oxide-containing components or the corresponding pure substances preferably being used here.

The invention thus relates to ceramic moldings composed of aluminum oxide which have a proportion of inter-crystalline fracture of more than 50%, an average pore radius of more than 4 μm and a porosity of more than 2%, obtained by:

a) grinding aluminum oxide which is at least 99.5% pure and has an average primary crystal size of 1 to 4 μm to an average fragment size of 2 to 7 μm, b) adding a source of magnesium oxide, silicon oxide and calcium oxide in amounts such that the magnesium oxide content is 0.2 to 2.5%, preferably 0.4 to 1%, the silicon dioxide content is 1 to 6%, preferably 2 to 4%, and the calcium oxide content is 0.1 to 2.5%, preferably 0.8 to 2%, in each case with respect to the amount of $Al_2O_3$,
c) shaping a green compact and
d) sintering.

In order to produce the ceramic moldings according to the invention, commercially available alumina which has an aluminum oxide content of at least 99.5% and an average primary particle size of 1 to 4 μm is first ground to an average particle size of 2 to 7 μm. The primary particle size is defined as the size of the native individual crystallite in the alumina agglomerate and can be determined, for example, by examining unground alumina powder under the scanning electron microscope. The average fragment size of the ground alumina, on the other hand, is determined in aqueous suspension by the laser light scattering principle using the SILAS HR 850 laser granulometer. It is particularly advantageous to establish a particle size spectrum which has a reduced proportion of fine particles and to produce a crystallite habit which is as irregular as possible. This is effected by the choice of a suitable grinding method which by virtue of the method, is able to produce a smaller proportion of fine particles and promotes the formation of more splintery particles. A suitable method is, for example, the preparation of powder in an air jet mill with downstream screening of the ground material.

The substances provided as sinter aids, which provide the MgO, $SiO_2$ and CaO fractions, can already be added before or during the grinding operation. Preferably, however, the procedure is that these sinter aids are ground separately and added to the ground aluminum oxide only prior to or during the so-called dispersion. Suitable sinter aids within the framework of the invention are all minerals which produce magnesium oxide, silicon oxide and calcium oxide on final sintering. Examples of such minerals are talc, magnesium carbonate, basic magnesium carbonate, calcium silicate and calcium carbonate. Magnesium oxide and silicon dioxide can also be used directly as source for MgO and $SiO_2$.

Grinding of the sinter aids is usually carried out in aqueous suspension. After grinding the water is removed, as a rule by spray-drying. Both the spray-dried sinter aids and the prepared alumina are then processed together in a manner known per se with suitable organic solvents and/or dispersing agents, binders, plasticizers and antifoams by grinding to give a dispersion (slip). This dispersion operation is preferably carried out in two steps, by first dispersing the alumina only with the solvent and the dispersing agent. The addition of the binders and any other additives is then made in a second grinding operation. The addition of the pre-ground sinter aids can be made during this dispersion, if not already carried out during the first grinding of the alumina.

The slip obtained in this way is processed by conventional shaping methods, for example by pouring into a plaster mold in the case of aqueous slip or by casting to give a strip, from which the components are punched after a subsequent drying step. It is advantageous if v-shaped notches are impressed in the green components during this shaping. After sintering the ceramic material is broken along these notches. Components are thus obtained which have a highly structured fracture surface as a result of pores and intergranular fracture pattern. This intergranular fracture pattern, together with the pore structure introduced, makes a substantial contribution towards better adhesion to a metallization applied thereto.

Shaping can also be carried out by dry pressing of the mixture composed of the finely ground and dried aluminum oxide and the metal oxides (sinter aids) in accordance with methods known per se.

The green compact obtained after shaping is finally sintered under customary conditions at temperatures in the range from 1500° to 1650° C. The components thus obtained are then subjected, if appropriate, to a mechanical or chemical treatment of the surfaces or fracture surfaces using conventional methods and are at least partly metallized by conventional processes, for example by currentless nickel plating or electroplating with nickel, after which further metal layers, for example Cu, Ag and/or Au layers, can also be applied.

Incipient etching of the ceramic surface before metallization, for example using hydrofluoric acid, is particularly advantageous in order thus to obtain a fresh surface with improved adhesion with respect to the metallization layer.

The ceramic moldings according to the invention are distinguished by improved adhesion at the ceramic/-metallization layer interface, as can be seen from the measured values for the strength in the following illustrative embodiments.

EXAMPLES

EXAMPLE 1

(Comparison experiment)

1708 parts by weight of an alumina which has not been preground and has an average primary particle size of 2.8 to 3.2 μm are ground in a drum mill together with 37.8 parts by weight of steatite (talc), 36.0 parts by weight of kaolin, 7.2 parts by weight of wollastonite and 11.0 parts by weight of basic magnesium carbonate with the addition of 2000 parts by weight of grinding bodies composed of 92% aluminum oxide (cylinder $\phi$20 mm) and 1100 parts by volume of water in such a way that a particle size distribution is obtained which has a $d_{50}$ value of 2.9 μm, a $d_{10}$ value of 0.6 μm and a $d_{90}$ value of 6.0 μm. The slip thus obtained is then spray-dried.

140 parts by weight of these sprayed particles are then dispersed in a drum mill, filled with 60 parts by weight of grinding bodies (cylinder $\phi<20$ mm), in 48 parts by weight of a solvent mixture composed of trichloroethene and ethanol with the addition of 1.4 parts by weight of fish oil for a period of 46 hours. 8.4 parts by weight of a mixture of polyvinylbutyral, dioctylphthalate and polyethylene glycol are then added to the dispersed ceramic powders in the drum mill and the mixture is ground for a period of 23 hours.

The viscosity of the casting slip prepared in this way in the grinding drum is about 4000 cP (at 21° C). The slip is cast at a rate of 0.75 m/min onto a steel belt conveyor wetted with release agent, to give a sheet which has a layer thickness of 0.64 mm and is then dried over a length of about 30 m in a temperature gradient rising from about 20° C. to about 80° C., to give a green sheet, which is then cut into strips and wound onto rolls.

The green substrates are shaped from the sheet strips by punching and notching and are coated with non-reactive oxide granules as release agent stacked one over each other and sintered at 1580° C. After sintering, the release powder is brushed off and the substrates are subjected to a heat after-treatment at 1300° C for smoothing.

In order to determine the adhesion of a metallization in the fracture surface, the substrates are then broken along the notch which has been introduced. After etching treatment in a hydrofluoric acid bath for a few minutes, nickel is first deposited at the fracture surface under currentless conditions up to a layer thickness of ≦0.1 μm. In a subsequent electroplating process step, the thickness of the nickel layer is increased to 5 μm. In order to achieve good solderability, a tin-lead layer is finally deposited by electroplating.

Two samples prepared in this way are bonded directly to one another by soldering and then subjected to a tensile test. The average value for the strength of the metal/ceramic composite determined from a sufficiently large number of samples is 25 MPa.

EXAMPLE 2

(Comparison experiment to determine the influence of the pore structure)

An alumina which has not been preground and according to the supplier has an average primary particle size of 2 to 3 μm is ground in a fluidized bed countercurrent mill (type AFG 400; manufacturer Alpine, Augsburg) in such a way that a particle size distribution is obtained which has a $d_{50}$ value of 4.4 μm, a $d_{10}$ value of 1.2 μm and a $d_{90}$ value of 9.1 μm.

133 parts by weight of the ground alumina are dispersed for a period of 46 hours in a drum mill, filled with 60 parts by weight of grinding bodies composed of 92% pure aluminum oxide (cylinder ϕ20 mm), with 48 parts by weight of a solvent mixture composed of trichloroethene and ethanol with the addition of 1.4 parts by weight of fish oil and 7 parts by weight of sprayed granules composed of diverse sinter aids. These sprayed granules are prepared separately by grinding 462 parts by weight of steatite, 440 parts by weight of kaolin, 87 parts by weight of wollastonite and 132 parts by weight of basic magnesium carbonate in a drum mill charged with 2000 parts by weight of grinding bodies (cylinder ϕ20 mm) and 1400 parts by volume of water, with subsequent spray-drying.

After the dispersing step, 8.4 parts by weight of a mixture of polyvinylbutyral, dioctyl phthalate and polyethylene glycol are added to the dispersed ceramic powders in the drum mill and the mixture is ground for a further period of 23 hours.

The further processing to give the ceramic substrate and the subsequent production of the ceramic/metal composite in the ceramic fracture surface are carried out as explained in Example 1. In this example an average strength of the ceramic/metal composite of 45 MPa is obtained in the tensile test.

EXAMPLE 3

(according to the invention)

Influence of the combination of pore structure plus intergranular fracture (by means of increased addition of alkaline earth )

An alumina which has not been preground and according to the manufacturer has an average primary particle size of 2.8 to 3.2 μm is ground in a fluidized bed countercurrent mill (type AFG 400) in such a way that a particle size distribution is obtained which has a $d_{50}$ value of 4.0 μm, a $d_{10}$ value of 1.0 μm and a $d_{90}$ value of 7.5 μm.

130.8 parts by weight of the alumina ground in this way are dispersed for a period of 46 hours in a drum mill with 49.4 parts by weight of the solvent and dispersing agent mixture indicated in Example 1, with the addition of 12.2 parts by weight of sprayed granules composed of the sinter aids. These sinter aids are prepared separately by grinding 274 parts by weight of steatite, 457 parts by weight of kaolin, 92 parts by weight of basic magnesium carbonate and 300 parts by weight of calcium carbonate in a drum mill, filled with 2000 parts by weight of grinding bodies, with the addition of 1400 parts by volume of water, with final spray-drying of the slip. After the dispersing step, 8.4 parts by weight of the binder and plasticizer mixture indicated in Example 1 are added and the mixture is ground for a further 23 hours.

The processing to give the ceramic substrate and the subsequent production of the ceramic/metal composite in the ceramic fracture surface are carried out as explained in Example 1. An average strength of 55 MPa was obtained in the tensile test.

EXAMPLE 4

(according to the invention)

129 parts by weight of an alumina prepared analogously to Example 3 are dispersed for a period of 46 hours with 49.4 parts by weight of the solvent and dispersing agent mixture indicated in Example 1, with the addition of 15.4 parts by weight of sprayed granules composed of the sinter aids. The sinter aids are prepared by grinding 122 parts by weight of steatite, 591 parts by weight of kaolin, 72 parts by weight of basic magnesium carbonate and 346 parts by weight of calcium carbonate in a drum mill, filled with 2000 parts by weight of grinding bodies, with the addition of 1400 parts by volume of water, with spray-drying of the slip.

The further processing operation via production of the casting slip, the casting process, shaping and ceramic firing with subsequent production of a ceramic/-metal composite in the fracture surface is carried out as explained in Example 1. An average strength of 61MPa was obtained in the tensile test.

The further physical properties determined from specimens from the illustrative embodiments are compared in the table below. The following measurement methods were used:

The porosity of the specimens was determined by determining the density by buoyancy measurement.

The proportion of intercrystalline fracture at the fracture surface was determined by optical examination of the fracture along the notch under the scanning electron microscope using a magnification of 1000 to 1500.

The average pore radius was defined by preparing a ground section and by optical analysis of the micrograph.

TABLE

| Example | 1 | 2 | 3 | 4 |
|---|---|---|---|---|
| Porosity [%] | 4.2 | 7.2 | 6.5 | 7.9 |
| Intercrystalline fracture [%] | ≦30 | ≦30 | >70 | >70 |
| Average pore diameter [μm] | 2.8 | 5.3 | 5.1 | 5.7 |

What is claimed is:

1. A ceramic molding comprised of aluminum oxide having a proportion of intercrystalline fracture of more than 50%, an average pore radius of more than 4 μm and a porosity of more than 2%, obtained by:

a) grinding aluminum oxide which is at least 99.5% pure and has an average primary crystal size of 1 to 4 μm to an average particle size of 2 to 7 μm;

b) adding a source of magnesium oxide, silicon oxide and calcium oxide in amounts such that the magnesium oxide content is 0.2 to 2.5% by weight, the silicon dioxide content is 1 to 6% by weight, and the calcium oxide content is 0.1 to 2.5% by weight, in each case with respect to the amount of $Al_2O_3$;

c) shaping a green compact; and d) sintering.

2. The ceramic molding as claimed in claim 1, wherein a source of magnesium oxide, silicon oxide and calcium oxide is added in amounts such that the magnesium oxide content is 0.4 to 1% by weight, the silicon dioxide content is 2 to 4% by weight and the calcium oxide content is 0.8 to 2% by weight, in each case with respect to the amount of $Al_2O_3$.

3. The ceramic molding as claimed in claim 1, wherein the magnesium oxide source used for its production is talc, magnesium oxide, magnesium carbonate or basic magnesium carbonate.

4. The ceramic molding as claimed in claim 1, wherein the calcium oxide source used for its production is wollastonite, dolomite or calcium carbonate.

5. The ceramic molding as claimed in claim 1, wherein notches are made when shaping the green compact.

6. The ceramic molding as claimed in claim 5, wherein said notches are v-shaped notches, and wherein after sintering in step d), the ceramic material is broken along these notches.

7. The ceramic molding as claimed in claim 1, wherein the grinding of step a) is carried out in an air jet mill with downstream screening of the ground material.

8. The ceramic molding as claimed in claim 1, wherein the average particle size distribution obtained after the grinding step a) has a $d_{50}$ value of 4.0 μm, a $d_{10}$ value of 1.0 μm and a $d_{90}$ value of 7.5 μm.

9. The ceramic molding as claimed in claim 8, wherein the average primary particle size of the aluminum oxide is 2.8 to 3.2 μm.

10. The ceramic molding as claimed in claim 1, wherein after step d), the ceramic surface is etched using hydrofluoric acid to obtain a fresh surface with improved adhesion.

11. A ceramic molding comprised of aluminum oxide having a proportion of intercrystalline fracture of more than 50%, an average pore radius of more than 4 μm and a porosity of more than 2%.

* * * * *

UNITED STATES PATENT AND TRADEMARK OFFICE
CERTIFICATE OF CORRECTION

PATENT NO. : 5,424,257

DATED : June 13, 1995

INVENTOR(S) : Bralt R. Schat, Wolfgang Krahn, Juergen Ruska

It is certified that error appears in the above-identified patent and that said Letters Patent is hereby corrected as shown below:

On title page, item [73], should read as follows:

Assignors: Hoechst CeramTec Aktiengesellschaft
D-95098 Selb, Federal Republic of Germany and Philips Electronics N.V.
NL-5621 BA Eindhoven, The Netherlands Signed and Sealed this Twenty-eighth Day of May, 1996

Attest:

BRUCE LEHMAN

Attesting Officer

Commissioner of Patents and Trademarks